United States Patent
Tazume

(10) Patent No.: US 12,179,922 B2
(45) Date of Patent: Dec. 31, 2024

(54) UNMANNED AIRCRAFT SYSTEM, CONTROL DEVICE AND CONTROL METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 855 days.

(21) Appl. No.: 17/417,546

(22) PCT Filed: Nov. 15, 2019

(86) PCT No.: PCT/JP2019/044928
§ 371 (c)(1),
(2) Date: Jun. 23, 2021

(87) PCT Pub. No.: WO2021/095249
PCT Pub. Date: May 20, 2021

(65) Prior Publication Data
US 2022/0048621 A1 Feb. 17, 2022

(51) Int. Cl.
*B64D 1/22* (2006.01)
*B64D 1/12* (2006.01)
(Continued)

(52) U.S. Cl.
CPC ............... *B64D 1/22* (2013.01); *B64D 1/12* (2013.01); *B66D 1/485* (2013.01); *B64U 10/13* (2023.01);
(Continued)

(58) Field of Classification Search
CPC . B64D 1/22; B64D 1/12; B66D 1/485; B64U 2101/66; B64U 2101/67;
(Continued)

(56) References Cited

U.S. PATENT DOCUMENTS

| | | | | |
|---|---|---|---|---|
| 6,086,015 A | * | 7/2000 | MacCready, Jr. | .... G05D 1/0094 244/45 R |
| 9,969,494 B1 | * | 5/2018 | Buchmueller | ........... B64D 1/12 |

(Continued)

FOREIGN PATENT DOCUMENTS

| | | |
|---|---|---|
| EP | 3 663 236 A1 | 6/2020 |
| JP | 2005-263112 A | 9/2005 |

(Continued)

OTHER PUBLICATIONS

TechBreak, DJI Phantom 3 Payload Test | How much Can Phantom 3 Pick Up?, posted Jul. 12, 2015; available on YouTube at https://www.youtube.com/watch?v =-ZJJf93vrFA; last accessed Jun. 10, 2024 (Year: 2015).*

(Continued)

*Primary Examiner* — Hunter B Lonsberry
*Assistant Examiner* — Harrison Heflin
(74) *Attorney, Agent, or Firm* — Sughrue Mion, PLLC

(57) ABSTRACT

The present invention has an object of providing an unmanned aircraft system, control device and control method which can more easily anchor a package to a linear member. An unmanned aircraft system (1) of an embodiment of the present invention includes: an unmanned aircraft (2) including a hoisting mechanism capable of feeding out and hoisting a linear member (31); a flight control unit (61) which causes the unmanned aircraft (2) to take off in a state in which a package (T) anchored to the linear member (31) is arranged on a ground surface; and a hoisting control unit (62) which causes the linear member (31) to be hoisted by the hoisting mechanism (3), after the unmanned aircraft (2) has taken off, in a case of a hoisting condition indicating a state enabling hoisting of the linear member (31) being satisfied.

18 Claims, 8 Drawing Sheets

(51) Int. Cl.
  *B64U 10/13* (2023.01)
  *B64U 50/19* (2023.01)
  *B64U 101/30* (2023.01)
  *B64U 101/66* (2023.01)
  *B64U 101/67* (2023.01)
  *B66D 1/48* (2006.01)

(52) U.S. Cl.
  CPC .......... *B64U 50/19* (2023.01); *B64U 2101/30* (2023.01); *B64U 2101/66* (2023.01); *B64U 2101/67* (2023.01); *B64U 2201/00* (2023.01); *B64U 2201/20* (2023.01)

(58) Field of Classification Search
  CPC .... B64U 2201/00; B64U 10/13; B64U 50/19; B64U 2101/30; B64U 2201/20
  See application file for complete search history.

(56) References Cited

U.S. PATENT DOCUMENTS

| | | |
|---|---|---|
| 2016/0318609 A1 | 11/2016 | Lynn et al. |
| 2018/0072420 A1* | 3/2018 | Prager ..................... B64D 1/12 |
| 2018/0072422 A1* | 3/2018 | Shannon ............. G06Q 10/083 |
| 2018/0141682 A1* | 5/2018 | Blake ..................... B64U 70/97 |
| 2019/0375504 A1* | 12/2019 | Schmalzried .......... B64U 70/90 |
| 2020/0140245 A1 | 5/2020 | Yasuda |
| 2020/0180763 A1* | 6/2020 | Schutz ..................... B64D 1/22 |
| 2020/0207474 A1* | 7/2020 | Foggia .................... B64C 27/08 |
| 2021/0011492 A1* | 1/2021 | Raabe ..................... B64D 1/22 |
| 2022/0204162 A1* | 6/2022 | Campbell ................ B66D 1/60 |

FOREIGN PATENT DOCUMENTS

| | | |
|---|---|---|
| JP | 2016-088675 A | 5/2016 |
| JP | 2018-055692 A | 4/2018 |
| WO | 2018/194026 A1 | 10/2018 |
| WO | 2019/026346 A1 | 2/2019 |

OTHER PUBLICATIONS

Office Action for corresponding JP 2021-516702, dated May 11, 2021.

International Search Report for PCT/JP2019/044928, dated Jan. 7, 2020.

* cited by examiner

UNMANNED AIRCRAFT SYSTEM, CONTROL DEVICE AND CONTROL METHOD

CROSS REFERENCE TO RELATED APPLICATIONS

This application is a National Stage of International Application No. PCT/JP2019/044928 filed Nov. 15, 2019.

TECHNICAL FIELD

The present invention relates to an unmanned aircraft system, a control device and a control method.

BACKGROUND ART

It is being considered to transport cargo using an aircraft which can fly unmanned such as a so-called drone. For example, supplementing a box or the like accommodating cargo to an aircraft, and delivering the cargo by releasing the box in a state of the aircraft landed has been carried out. In this case, as the delivery location of cargo, a flat location having at least a certain area in which the aircraft can land becomes necessary.

Therefore, as disclosed in Patent Document 1 described below, for example, it is also being considered to provide a hoisting mechanism (winch) capable of feeding out and winding up a linear member such as wire or cable to the aircraft, retain a package (can include cargo and a container accommodating cargo) at the leading end of the linear member, and deliver cargo while remaining in the air, without the aircraft landing. According to such a method, so long as there is a relatively small space which can place the package, it is possible to deliver the cargo. In addition, according to the device configuration, there are also cases where it is possible to deliver a package in a shorter time by feeding out the linear member than landing the aircraft.

Patent Document 1: Japanese Unexamined Patent Application, Publication No. 2016-88675

DISCLOSURE OF THE INVENTION

Problems to be Solved by the Invention

In the technology of transporting packages anchored to a linear member such as that disclosed in Patent Document 1 by an unmanned aircraft, in order to improve the delivery efficiency, it has been sought to anchor a package to a linear member more easily.

The present invention has an object of providing an unmanned aircraft system, a control device and a control method which can anchor a package to a linear member more easily.

Means for Solving the Problems

An unmanned aircraft system according to an aspect of the present invention includes: an unmanned aircraft including a hoisting mechanism capable of feeding out and hoisting a linear member; a flight control unit which causes the unmanned aircraft to take off in a state in which a package anchored to the linear member is arranged on a ground surface; and a hoisting control unit which causes the linear member to be hoisted by the hoisting mechanism, after the unmanned aircraft has taken off, in a case of a hoisting condition indicating a state enabling hoisting of the linear member being satisfied.

A control device for an unmanned aircraft according to another aspect of the present invention includes: a flight control unit which causes an unmanned aircraft to take off in a state in which a package anchored to a linear member is arranged on a ground surface; and a hoisting control unit which causes the linear member to be hoisted by a hoisting mechanism, after the unmanned aircraft has taken off, in a case of a hoisting condition indicating a state enabling hoisting of the linear member being satisfied.

A control method for an unmanned aircraft according to yet another aspect of the present invention includes the steps of: causing an unmanned aircraft to take off in a state in which a package anchored to a linear member is arranged on a ground surface; and hoisting the linear member by a hoisting mechanism, after the unmanned aircraft has taken off, in a case of a hoisting condition indicating a state enabling hoisting of the linear member being satisfied.

Effects of the Invention

According to the present invention, it is possible to provide an unmanned aircraft system, a control device and a control method which can more easily anchor a package to a linear member.

PREFERRED MODE FOR CARRYING OUT THE INVENTION

Figure 1:
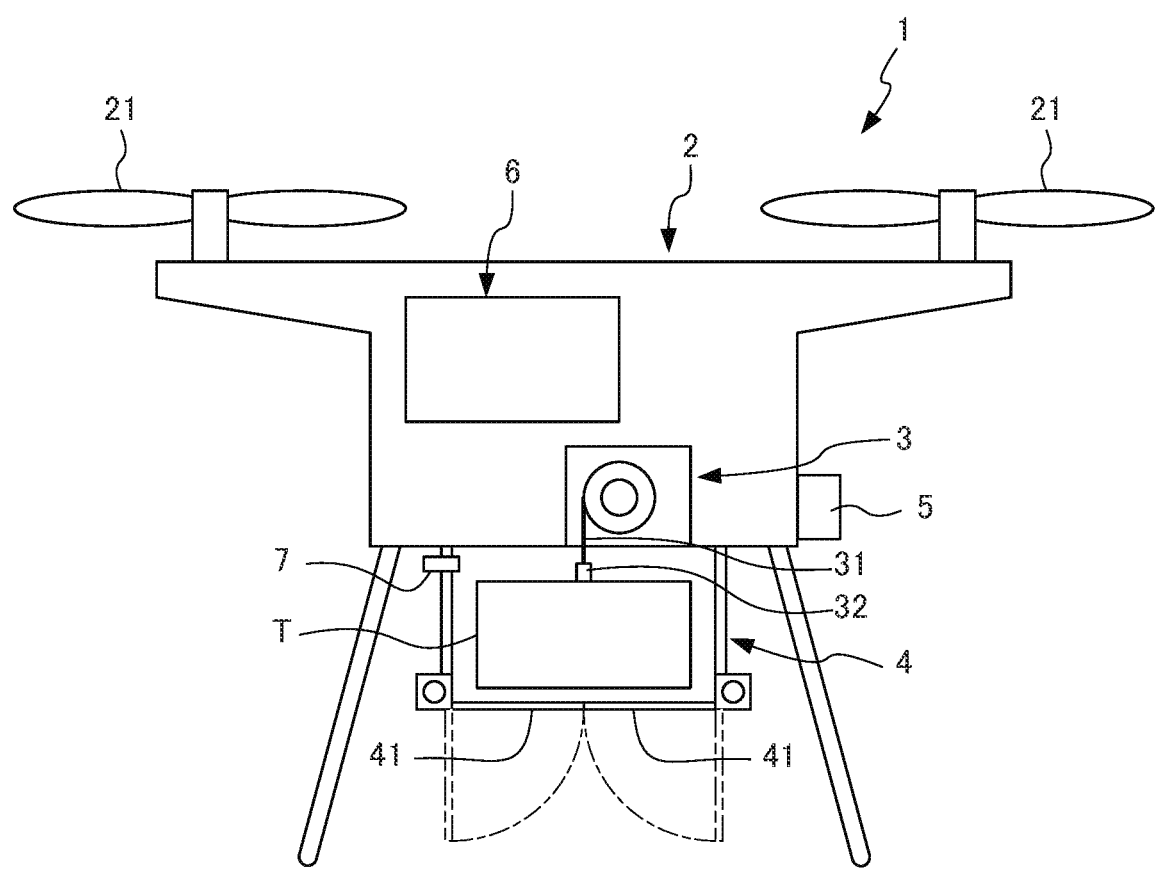
FIG. 1 is a schematic diagram showing the configuration of an unmanned aircraft system according to an embodiment of the present invention.

Hereinafter, an unrestrictive illustrative embodiment of the present invention will be explained while referencing the drawings. FIG. 1 is a schematic diagram showing the configuration of an unmanned aircraft system 1 according to an embodiment of the present invention. The unmanned aircraft system 1 transports a package T unmanned, by flying in a state retaining the package T.

As shown in FIG. 1, the unmanned aircraft system 1 includes: an unmanned aircraft 2, a hoisting mechanism 3, a drop-preventing mechanism 4, an imaging unit 5, and a control device 6.

The unmanned aircraft 2 is not particularly limited so long as capable of flying unmanned; however, the unmanned aircraft 2 of the present embodiment illustrated is an unmanned rotorcraft having a plurality of rotor blades 21. In addition, the unmanned aircraft 2 further has a battery, etc. (not illustrated) which supplies electric power for driving the rotor blades 21.

The hoisting mechanism 3 is provided to the unmanned aircraft 2, and is able to feed out and hoist the linear member 31 capable of connecting the package T to the leading end. The hoisting mechanism 3 is a winch which can hoist the linear member 31 by way of a motor (not illustrated). As the linear member 31 hoisted by the hoisting mechanism 3, for example, a member having flexibility such as a rope or wire can be used.

The linear member 31 may join the leading end part thereof to the package T, and may have a connecting member 32 for connecting the package T to the leading end. The connecting member 32 provided to the leading end of the linear member 31 may be separable from the package by a person manipulating a hook, shackle or the like, for example, and may have a detach mechanism which can detach the package T unmanned.

The mechanism for connecting of the connecting member 32 may be a mechanism which holds mechanically using frictional force, or may be made using the magnetic force of an electromagnet or the like.

The drop-preventing mechanism 4 is configured so as to be able to prevent dropping of the package T by holding the package T even if the connection with the linear member 31 was released, in a state in which the hoisting mechanism 3 brings the package T to within a fixed range from the unmanned aircraft 2 by hoisting the linear member 31.

The mobile support 41 is configured so as to support at least the bottom of the package T in a state supporting the package T. In addition, the mobile support 41 may be configured so as to restrict the movement to the side of the package T by abutting the lateral surface of the package T, and may also serve as a member holding the package T to be immobile while flying.

The imaging unit 5, for example, is configured by a digital camera which can capture still images and moving images. The imaging unit 5 is installed to a lateral surface of the unmanned aircraft 2, and captures still images and moving images in the direction below the unmanned aircraft 2.

The control device 6, for example, can be realized by introducing a predetermined program to a computer device equipped with a CPU, memory, etc. The control device 6 may communicate with an external server (remote control device) arranged at a position distanced from the unmanned aircraft 2 via a communication unit. In addition, the unmanned aircraft 2 may be configured so as to be able to return to a predetermined delivery base or the like, after delivering the package T to the receiver by flying to the destination independently according to the control of the control device 6, even if there is no instruction from the remote control device.

The altimeter 7, for example, is a barometric pressure meter, and measures the altitude of the unmanned aircraft 2. It should be noted that the altimeter 7 may measure the altitude by another method.

Figure 2:
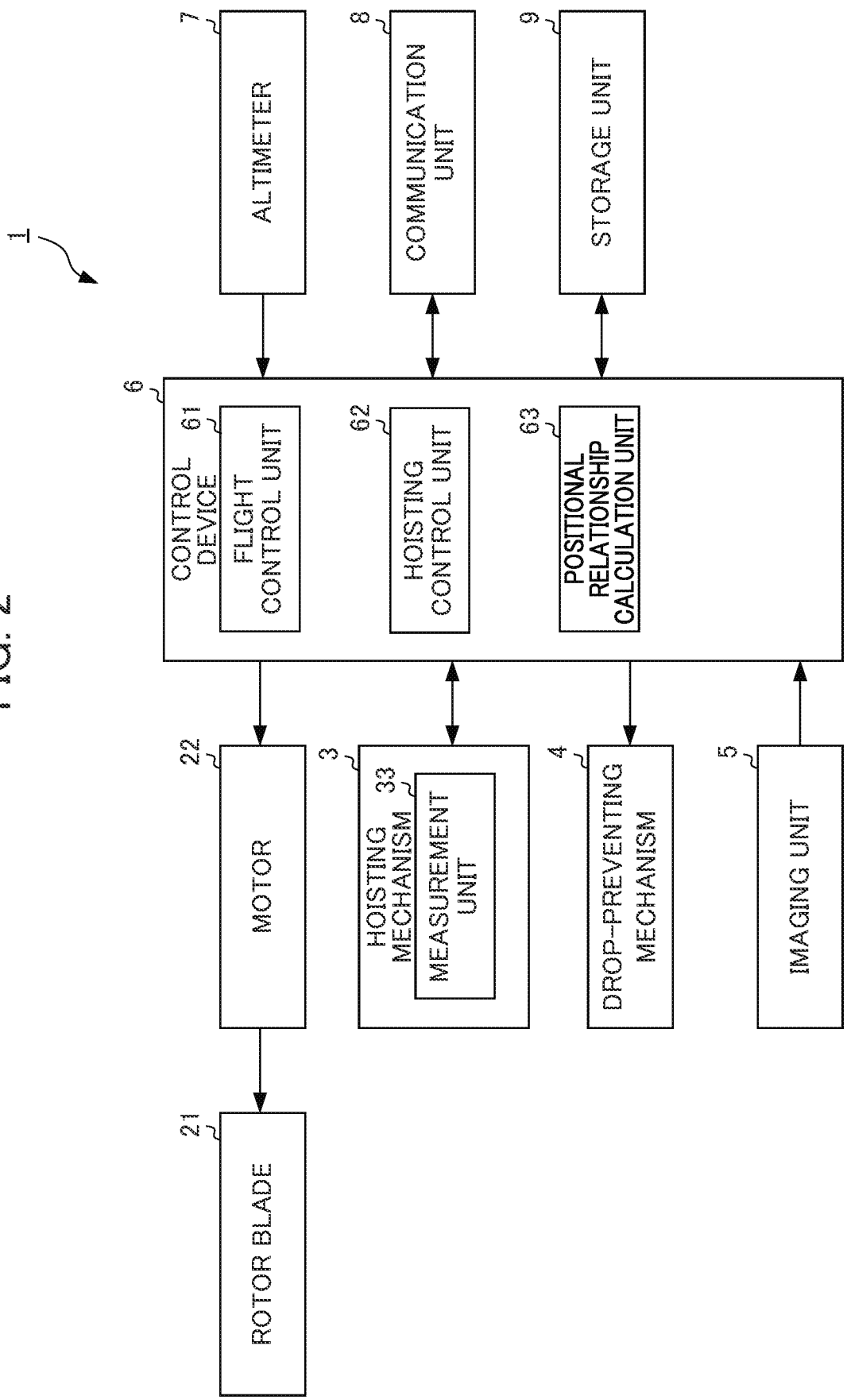
FIG. 2 is a block diagram showing a functional configuration of an unmanned aircraft system.

Next, operation of the unmanned aircraft system 1 according to the present embodiment will be explained by referencing FIGS. 2 and 3. FIG. 2 is a block diagram showing the functional configuration of the unmanned aircraft system 1.

As shown in FIG. 2, the unmanned aircraft system 1 includes: rotor blades 21, a motor 22, hoisting mechanism 3, drop-preventing mechanism 4, imaging unit 5, control device 6, altimeter 7, communication unit 8, and storage unit 9.

The plurality of rotor blades 21 and motor 22 provided to each of the plurality of rotor blades 21 make the unmanned aircraft system 1 fly by the rotation being controlled by the control device 6.

The hoisting mechanism 3 has a measurement unit 33. The measurement unit 33, for example, is configured by a rotation detection sensor, and measures the feed out length of the linear member 31. The measurement unit 33 outputs to the control device 6 a measured feed out length of the linear member 31. The measurement unit 33 may use another method which can measure the feed out length of the linear member 31. For example, the measurement unit 33 may be made a configuration in which the control device 6 has a meter which calculates the feed out length based on the rotation amount.

The drop-preventing mechanism 4 operates in accordance with the control of the control device 6. For example, the mobile support 41 of the drop-preventing mechanism 4 transitions between a state preventing dropping of the package T (and falling), and a state enabling dropping (and falling) of the package T, in accordance with the control of the control device 6.

The imaging unit 5 functions as detector, and detects the positional relationship calculation information by capturing images of the package T. The imaging unit 5 outputs the captured image to the control device 6.

The control device 6 is a processor such as a CPU (Central Processing Unit), and functions as a flight control unit 61, hoist control unit 62 and positional relationship calculation unit 63, by executing programs stored in the storage unit 23.

The altimeter 7 measures the altitude of the unmanned aircraft 2, and outputs the measurement results to the control device 6. The communication unit 8 performs wireless communication with a remote control device for remotely operating the unmanned aircraft 2, and other unmanned aircraft, etc.

The storage unit 9 is a storage device such as ROM (Read Only Member) and RAM (Random Access Memory) storing the OS (Operating System), application programs, etc., and a hard disk drive or SSD (Solid State Drive) which stores various other information.

It should be noted that the unmanned aircraft 2 may include various sensors such as a gyro sensor, acceleration sensor, ultrasonic sensor, magnetic direction sensor and GPS (Global Positioning System), in addition to the aforementioned configuration. For example, the unmanned aircraft 2 detects positional information of the unmanned aircraft 2 by GPS.

Figure 3A:
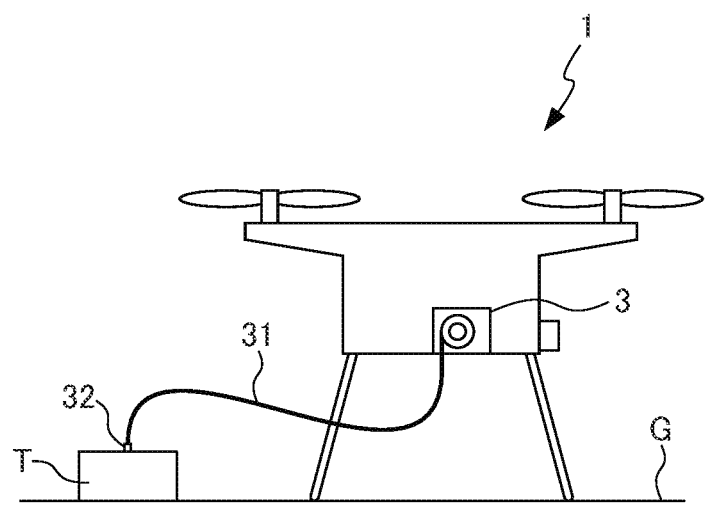
FIGS. 3A and 3B are a schematic diagram showing hoisting control of a linear member of the unmanned aircraft system.
Figure 3B:
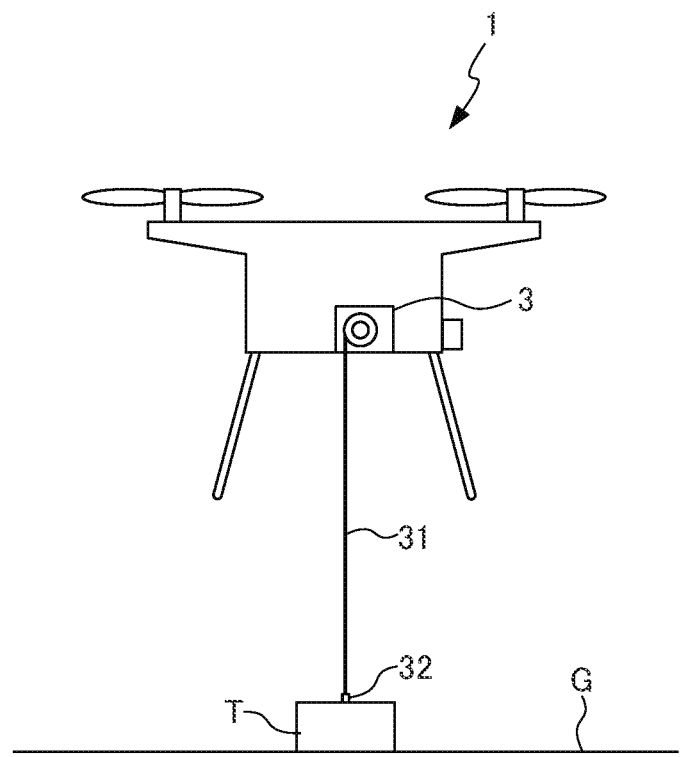

FIGS. 3A and 3B are a schematic diagram showing the hoisting control of the linear member 31 of the unmanned aircraft 2. It should be noted that, in FIGS. 3A and 3B, configurations such as of the drop-preventing mechanism 4 are omitted. As shown in FIG. 3A, in a state in which the unmanned aircraft 2 has touched down, the hoisting control unit 62 establishes a state releasing the linear member 31 by the hoisting mechanism 3, and feeding out the linear member 31. Then, the package T is connected to the linear member 31 in a state in which the unmanned aircraft 2 has touched down, and the leading end of the linear member 31 is distanced from the main portion of the unmanned aircraft 2.

By raising the unmanned aircraft 2 in a state releasing the linear member 31, the package T is hardly pulled by the linear member 31, and the unmanned aircraft system 1 can suppress the shock on the package T (for example, the package T falling, being dragged, etc.).

It should be noted that the release of the linear member 31, for example, is a state such that the linear member 31 is pulled out by the tensile force thereof, when the hoisting mechanism 3 releases the fixation of rotation of the winding cylinder which is winding the linear member 31, and the linear member 31 is drawn. In other words, it is state allowing the linear member 31 to be pulled out from the hoisting mechanism 3.

The flight control unit 61 makes the unmanned aircraft 2 take off in a state in which the package T anchored to the linear member 31 is arranged on the ground G.

Subsequently, as shown in FIG. 3B, after the unmanned aircraft 2 has taken off, when the unmanned aircraft 2 is positioned almost directly above the package T, the hoisting control unit 62 causes the linear member 31 to be hoisted by way of the hoisting mechanism 3. In other words, the hoisting control unit 62 causes the linear member 31 to be hoisted by the hoisting mechanism 3, after the unmanned aircraft 2 has taken off, in a case of the hoisting condition indicating a state enabling hoisting of the linear member 31 being satisfied.

In addition, the hoisting control unit 62 feeds out the linear member 31 by the hoisting mechanism 3, until the unmanned aircraft 2 takes off, and then the hoisting condition is satisfied. The unmanned aircraft 2 can thereby fly without changing the position and orientation of the package T anchored to the linear member 31.

In the hoisting control unit 62, the hoisting condition includes being a state in which the positional relationship calculated by the positional relationship calculation unit 63 allows for hoisting the linear member 31. Herein, state enabling hoisting may be a position determined as being directly above the package T by the hoisting control unit 62.

Then, the positional relationship calculation unit 63 calculates the positional relationship between the unmanned aircraft 2 and package T, based on the positional relationship calculation information detected by the imaging unit 5, altimeter 7 and measurement unit 33 serving as detectors.

For example, in the case of the detector being the imaging unit 5, the imaging unit 5 captures an image including the package T as positional relationship calculation information for calculating the positional information. In other words, the imaging unit 5 detects an image as the positional relationship calculation information. The positional relationship calculation unit 63 calculates the positional relationship between the unmanned aircraft 2 and package T based on an image including the package T captured by the imaging unit 5.

The positional information calculation unit 63 identifies the package T from the image including the package T, and calculates the external form and size of the identified package T. The positional relationship calculation unit 63 calculates the distance between the unmanned aircraft 2 and package T, by comparing between the external form and size of the package T stored in advance in the storage unit 9, and the external form and size of the package T calculated from the image including the package T. In addition, the positional relationship calculation unit 63 calculates the central coordinate of the package T from the image including the package T.

In this case, the hoisting control unit 62 determines whether the position of the unmanned aircraft 2 is in a state enabling hoisting of the linear member 31 (positional relationship between package T and unmanned aircraft 2 is a state enabling hoisting of the linear member 31), based on the distance between the unmanned aircraft 2 and package T and the central coordinate of the package T calculated by the positional relationship calculation unit 63.

For example, the hoisting control unit 62 determines as being a state enabling hoisting of the linear member 31, in a case of the distance between the unmanned aircraft 2 and package T being sufficiently separate, and the central coordinate of the package T being within a fixed range from the central coordinate of the unmanned aircraft 2. Herein, the central coordinate of the unmanned aircraft 2 is detected by the GPS, for example. When the unmanned aircraft 2 is located almost directly above the package T, the hoisting control unit 62 can thereby determine as being a state enabling hoisting of the linear member 31. In the present embodiment, the comparison processing of the central coordinate of the package T and the central coordinate of the unmanned aircraft 2 for determining the hoisting state is carried out using two-dimensional coordinates in the horizontal direction. It should be noted that it may be processing which processes the central coordinate of the unmanned aircraft 2 as three-dimensional coordinates, and uses in the comparison only a horizontal portion of the coordinates when processing to determine whether or not being within the aforementioned fixed range.

In addition, in the case of the detector being the measurement unit 33 and altimeter 7, the measurement unit 33 measures the feed out length of the linear member 31, and the altimeter 7 measures the altitude of the unmanned aircraft, thereby detecting the positional relationship calculation information. The positional relationship calculation unit 63 calculates the positional relationship based on the feed out length of the linear member 31 measured by the measurement unit 33 and the altitude of the unmanned aircraft 2 measured by the altimeter 7.

For example, the positional relationship calculation unit 63 calculates the distance between the unmanned aircraft 2 and the package T from the feed out length of the linear member 31 measured by the measurement unit 33. The hoisting control unit 62 determines as being a state enabling hoisting of the linear member 31, in the case of the distance between the unmanned aircraft 2 and package T being sufficiently separated, and the distance between the unmanned aircraft 2 and package T and the altitude from the group of the unmanned aircraft 2 matching. When the unmanned aircraft 2 is located almost directly above the package T, the hoisting control unit 62 can thereby determine as being a state enabling hoisting of the linear member 31.

In addition, the flight control unit 61 controls flight of the unmanned aircraft 2 based on the positional relationship between the unmanned aircraft 2 and package T detected by the imaging unit 5, altimeter 7 and measurement unit 33 as detectors, until hoisting condition is satisfied after the unmanned aircraft 2 takes off.

More specifically, after taking-off, the flight control unit 61 controls flight of the unmanned aircraft 2 so as to rise and move to a position almost directly below the package T, until the hoisting condition is satisfied. Then, after satisfying the hoisting condition and hoisting the linear member 31, the flight control unit 61 controls the unmanned aircraft 2 so as to fly towards the destination.

In addition, instead of the aforementioned embodiment, the unmanned aircraft system 1 may use a combination of the configuration made using the imaging unit 5 as the aforementioned detector, and the configuration made using the altimeter 7 and measurement unit 33 as detectors.

Figure 4:
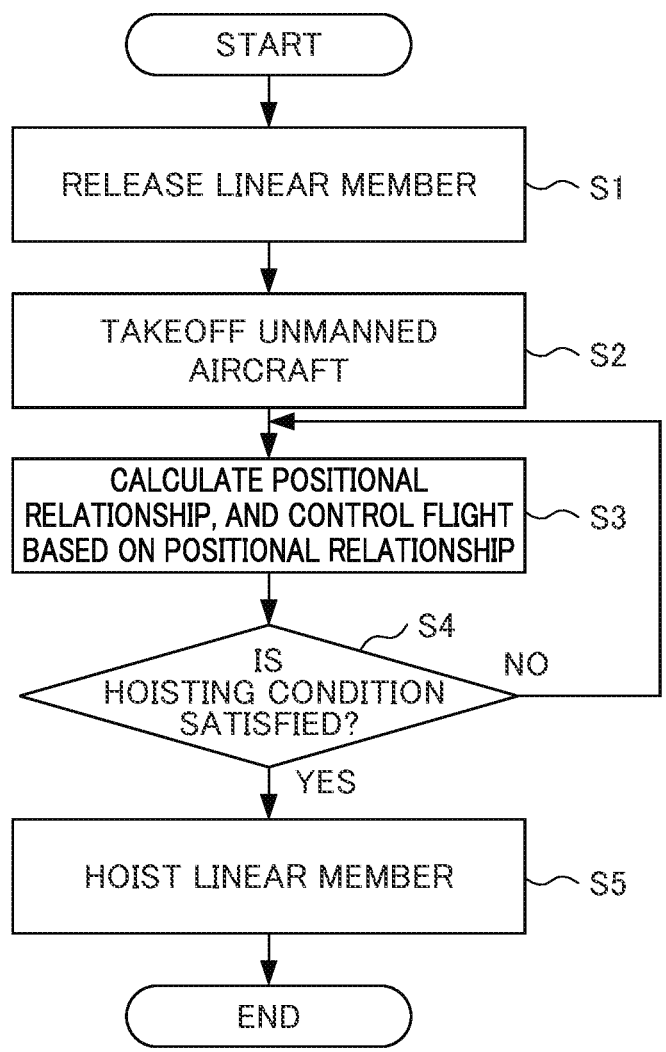
FIG. 4 is a flowchart showing processing of a control device of the unmanned aircraft system.

FIG. 4 is a flowchart showing processing of the control device 6 of the unmanned aircraft system 1. In Step S1, the hoisting control unit 62 releases the linear member 31 by the hoisting mechanism 3 in a state in which the unmanned aircraft 2 has touched down. Then, the package T is attached to the linear member 31 by the connecting member 32. In addition, the attachment of the package T to the connecting member 32 may be detected according to a timer built into the control device 6, operation of a remote control device by a user, or the like. The attachment of the package T to the connecting member 32 may be carried out by a person, or may be carried out by automatic control.

In Step S2, the flight control unit 61 makes the unmanned aircraft 2 take off from the ground G. The flight control unit 61 makes the unmanned aircraft 2 take off from the ground G, based on the event of detecting attachment of the package T to the connecting member 32, for example.

In Step S3, the positional relationship calculation unit 63 calculates the positional relationship between the unmanned aircraft 2 and package T based on the positional relationship calculation information detected by the imaging unit 5, altimeter 7 and measurement unit 33 serving as detectors, and the flight control unit 61 controls the flight of the unmanned aircraft 2 based on the positional relationship.

In Step S4, the hoisting control unit 62 determines whether the calculated positional relationship satisfies the hoisting condition. In the case of satisfying the aforementioned hoisting condition (YES), the processing advances to Step S5, and in the case of not satisfying the hoisting condition, the processing returns to Step S3.

In Step S5, the hoisting control unit 62 causes the linear member 31 to be hoisted to the hoisting mechanism 3. In addition, the hoisting control unit 62, after sufficiently hoisting the linear member 31 until the package T approaches within a fixed range from the unmanned aircraft 2, controls the mobile support 41 of the drop-preventing mechanism 4, and transitions to a state preventing dropping of the package T.

First Modified Example

Figure 5:
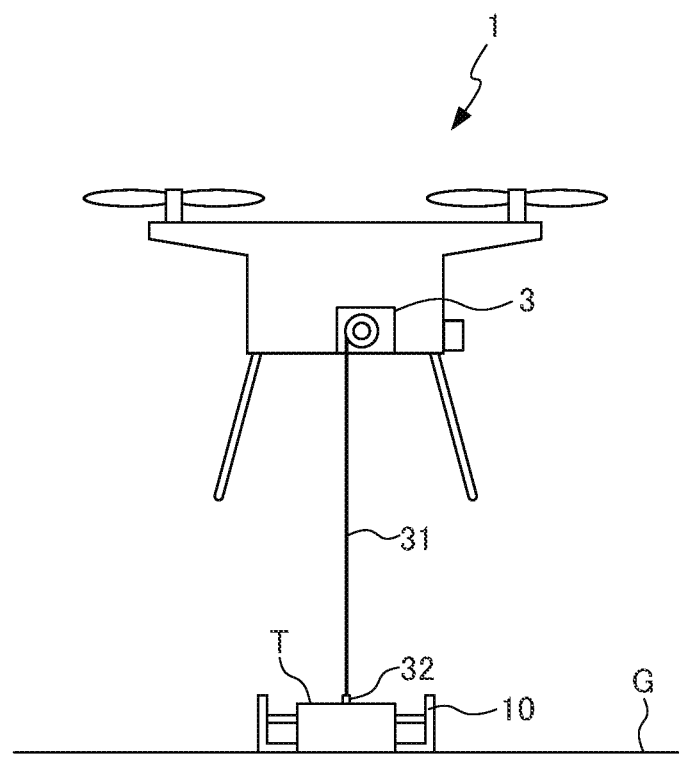
FIG. 5 is a schematic diagram showing the configuration of an unmanned aircraft system of a first modified example.

FIG. 5 is a schematic diagram showing the configuration of an unmanned aircraft system 1 of a first modified example. As shown in FIG. 5, the unmanned aircraft system 1 of the first modified example further includes a retaining device 10 which can fix and release the package T relative to the ground G.

The retaining device 10 is installed on the ground G, and is controlled by wirelessly communicating with the control device 6 or a remote control device. The retaining device 10 is able to fix and release the package T by any means, and fixes and releases the package T using a mechanical, electrical or electromagnetic configuration, for example. It should be noted that fixing of the package T to the ground G by the retaining device 10 does not necessarily require the package T contacting the ground G, and also includes a relationship in which the relative position and posture relationship between the package T and ground G are fixed.

The retaining device 10 fixes the package T in a state in which the unmanned aircraft 2 has landed on the ground G. The flight control unit 61 causes the unmanned aircraft 2 to land in a state fixing the package T by the retaining device 10.

Subsequently, as mentioned above, after the unmanned aircraft 2 has landed, in a case of the hoisting control unit 62 determining that the hoisting condition indicating a state enabling hoisting of the linear member 31 was satisfied, the retaining device 10 releases the fixing of the package T.

Then, when satisfying the hoisting condition, the hoisting control unit 62 causes the linear member 31 to be hoisted by the hoisting mechanism 3.

It should be noted that the unmanned aircraft system 1 may cause the unmanned aircraft 2 to take off in a state not releasing the linear member 31 (feed out length of linear member 31 not fixed). When raising the unmanned aircraft 2 in a state in which the package T and feed out length of the linear member 31 are not fixed, the unmanned aircraft 2 moves directly above the package T.

In other words, in a state in which the linear member 31 is taut, the force acting on the unmanned aircraft 2 becomes the resultant force of the force in the vertical upward direction by the rotor blades 21, and the force in the load direction by the linear member 31, and the unmanned aircraft 2 moves in accordance with this resultant force.

As a result of movement of the unmanned aircraft 2, if ultimately entering a state in which these two forces compete in opposite directions, the unmanned aircraft 2 will be mostly stopped in the air. In the competing state, since the two forces are opposite directions, the package T is present in the opposite direction to the vertical upward direction as viewed from the unmanned aircraft 2, i.e. the unmanned aircraft 2 is present directly above the package T.

Therefore, the unmanned aircraft system 1 can determine whether the hoisting state was satisfied even if not directly measuring the positional relationship between the package T and unmanned aircraft 2 (for example, based on whether having raised for a sufficient time).

In addition, even in the case of releasing the linear member 31 and raising the unmanned aircraft 2, unless the rotation resistance of the winding cylinder of the hoisting mechanism 3 is 0, a slight force will act on the package T. For this reason, in the case of the package being light, there is a possibility of the package falling and being dragged. However, by raising the unmanned aircraft in a state fixing the package as in the present modified example, it is possible to further suppress impact on the package in the meanwhile (for example, falling down, being dragged, etc.). For this reason, the unmanned aircraft system 1 of the present modified example is more favorable in the case of carrying a package which is light and is not desired to be shocked as much as possible (for example, a beverage in a cup, etc.).

Second Modified Example

Figure 6A:
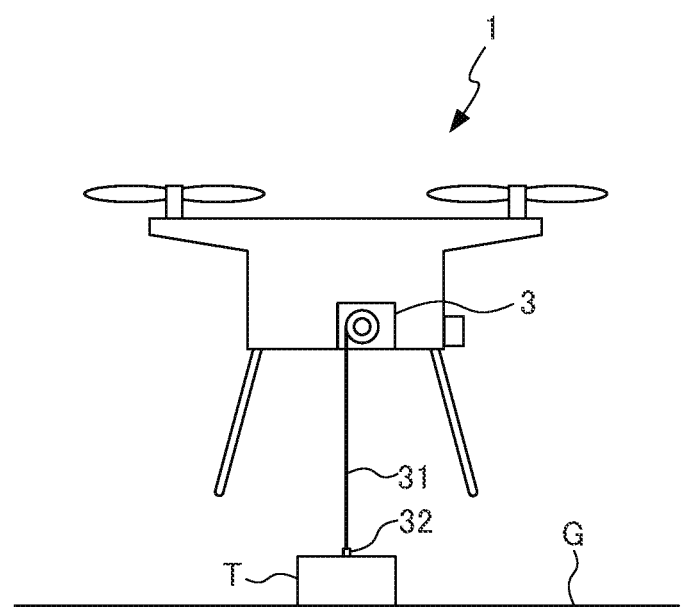
FIGS. 6A and 6B are a schematic diagram showing the configuration of an unmanned aircraft system of a second modified example.
Figure 6B:
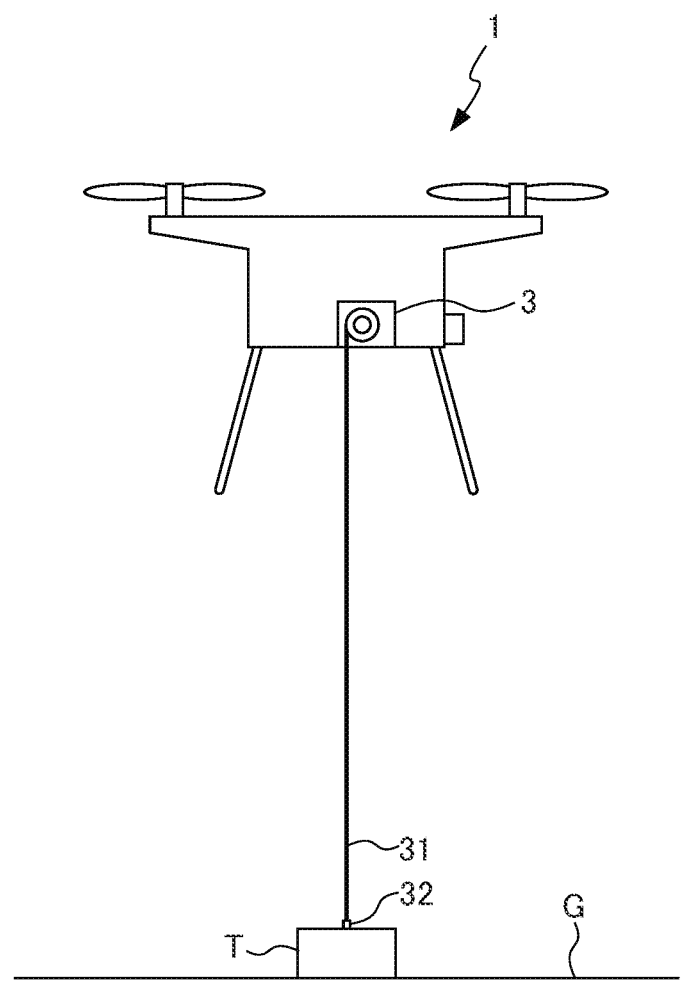

FIGS. 6A and 6B are a schematic diagram showing the configuration of an unmanned aircraft system 1 of a second modified example. As shown in FIGS. 6A and 6B, the unmanned aircraft system 1 of the second modified example includes the altimeter 7, and the hoisting control unit 62 feeds out of the linear member 31 by the hoisting mechanism 3 according to the altitude of the unmanned aircraft 2 measured by the altimeter 7.

More specifically, as shown in FIG. 6A, in the case of the altitude of the unmanned aircraft 2 being low, the hoisting control unit 62 feeds out the linear member 31 in a length according to the altitude of the unmanned aircraft 2 by the hoisting mechanism 3. Then, as shown in FIG. 6B, in the case of the altitude of the unmanned aircraft 2 being higher than in FIG. 6A, the hoisting control unit 62 further feeds out the linear member 31 by the hoisting mechanism 3.

In other words, with the aforementioned embodiment, the hoisting control unit 62 released the linear member 31 by the hoisting mechanism 3 until the hoisting condition is satisfied after the unmanned aircraft 2 takes off; however, in the first modified example, the hoisting control unit 62 does not release the linear member 31 by the hoisting mechanism 3, and feeds out the linear member 31 by the hoisting mechanism 3 according to the altitude of the unmanned aircraft 2.

It should be noted that, with the aforementioned embodiment, the control device 6 is provided inside of the unmanned aircraft 2; however, the control device 6 may be provided at a location distanced from the unmanned aircraft 2, and remotely control the unmanned aircraft 2 using wireless communication.

As is evident from the above explanation, each embodiment of the present invention exerts the respective favorable effects by each of the following configurations.

The unmanned aircraft system (1) according to the embodiment of the present invention includes: the unmanned aircraft (2) equipped with the hoisting mechanism capable of feeding out and hoisting the linear member (31); the flight control unit (61) which makes the unmanned aircraft (2) take off in a state in which the package (T) anchored to the linear member (31) is arranged on the ground surface (G); and the hoisting control unit (62) which hoists the linear member (31) by the hoisting mechanism (3) after the unmanned aircraft (2) takes off, in the case of the hoisting condition indicating a state enabling hoisting of the linear member (31) being satisfied.

With the unmanned aircraft system (1), the user can thereby more easily anchor the package (T) to the linear member (31), at a location distanced from the main portion of the unmanned aircraft (2), due to not hoisting the linear member (31) by the hoisting mechanism (3), in a state in which the unmanned aircraft (2) has landed.

In addition, the hoisting control unit (62) releases the linear member (31) to allow pulling out from the hoisting mechanism (3), until the hoisting condition is satisfied after the unmanned aircraft (2) takes off. The unmanned aircraft system (1) can thereby cause the unmanned aircraft (2) to fly without changing the position and orientation of the package (T) anchored to the linear member (31).

In addition, the hoisting condition includes the positional relationship calculated by the positional relationship calculation unit 63 being a state allowing for hoisting of the linear member 31. The unmanned aircraft system (1) can thereby appropriately hoist the linear member (31) from a position enabling hoisting of the linear member (31).

In addition, a state enabling hoisting of the linear member (31) is a position determined as being directly above the package (T) by the hoisting control unit (62). The unmanned aircraft system (1) can thereby hoist the linear member (31), when the unmanned aircraft (2) is directly above the package (T).

In addition, the positional relationship calculation unit (63) calculates the positional relationship between the unmanned aircraft (2) and the package (T), based on an image including the package (T) captured by the imaging unit (5). The unmanned aircraft system (1) can thereby appropriately calculate the positional relationship between the unmanned aircraft (2) and the package (T), using an image including the captured package (T).

In addition, the positional relationship calculation unit (63) calculates the positional relationship based on the feed out length of the linear member (31) measured by the measurement unit (33) and the altitude of the unmanned aircraft (2) measured by the altimeter (7). The unmanned aircraft system (1) can thereby appropriately calculate the positional relationship between the unmanned aircraft (2) and the package (T), using the feed out length of the linear member (31) and the altitude of the unmanned aircraft (2).

In addition, the flight control unit (61) controls flight of the unmanned aircraft (2) based on the positional relationship between the unmanned aircraft (2) and the package (T) detected by the detectors (5, 7, 33), until the hoisting condition is satisfied after the unmanned aircraft (2) takes off. The unmanned aircraft system (1) can thereby cause the unmanned aircraft 2 to fly according to the state of the linear member (31) and the package (T).

In addition, the unmanned aircraft system (1) further includes the retaining device (10) which can fix and release the package (T) relative to the ground surface, in which the flight control unit (61) causes the unmanned aircraft (2) to fly in a state fixing the package (T) by the retaining device (10). The unmanned aircraft (2) can thereby fly without changing the position and orientation of the package (T) anchored to the linear member (31), and hoist the linear member (31). Therefore, it is possible to reliably prevent the occurrence of a situation in which the package (T) falls before hoisting the linear member (31).

In addition, the flight control unit (61) causes the unmanned aircraft (2) to take off in a state not releasing the linear member (31). The unmanned aircraft system (1) is thereby more favorable in the case of carrying a package (T) which is light and is not desired to be shocked as much as possible (for example, a beverage in a cup, etc.).

In addition, the unmanned aircraft system (1) further includes the altimeter (7) which measures the altitude of the unmanned aircraft (2), and the hoisting control unit (62) feeds out the linear member by the hoisting mechanism (3) according to the altitude of the unmanned aircraft (2) measured by the altimeter (7). The unmanned aircraft system (1) can thereby fly without changing the position and orientation of the package (T) anchored to the linear member (31), and hoist the linear member (31).

The control device (6) of the unmanned aircraft (2) according to the embodiment of the present invention includes: the flight control unit (61) which causes the unmanned aircraft (2) to take off in a state in which the package (T) anchored to the linear member (31) is arranged on the ground surface (G); and the hoisting control unit (62) which causes the linear member (31) to be hoisted by the hoisting mechanism (3) after the unmanned aircraft (2) takes off, in a case of a hoisting condition indicating a state enabling hoisting of the linear member (31) being satisfied. The control device (6) can thereby more easily anchor the package (T) to the linear member (31), due to hoisting the linear member (31) by the hoisting mechanism (3), in a state in which the unmanned aircraft (2) has landed.

The control method of the unmanned aircraft (2) according to the embodiment of the present invention includes: a step of causing the unmanned aircraft (2) to take off in a state in which the package (T) anchored to the linear member (31) is arranged on the ground; and a step of causing the linear member (31) to be hoisted by the hoisting mechanism (3), after the unmanned aircraft (2) takes off, in a case of the hoisting condition indicating a state enabling hoisting of the linear member (31) being satisfied.

EXPLANATION OF REFERENCE NUMERALS 1 unmanned aircraft system
2 unmanned aircraft
3 hoisting mechanism
31 linear member
32 connecting member
33 measurement unit
4 drop-preventing mechanism 41 mobile support
5 imaging unit
6 control device
61 flight control unit
62 hoisting control unit
63 positional relationship calculation unit
7 altimeter
8 communication unit
9 storage unit
10 fixing device
21 rotor blade
22 motor
T package

The invention claimed is:

1. An unmanned aircraft system comprising:
an unmanned aircraft including a hoisting mechanism configured to feed out and hoist a linear member;
at least one memory configured to store program code; and
at least one processor configured to access the program code and operate as instructed by the program code, the program code including:
flight control code configured to cause at least one of the at least one processor to cause the unmanned aircraft to take off in a state in which a package anchored to the linear member is on a ground surface; and
hoisting control code configured to cause at least one of the at least one processor to release the linear member to be drawable out from the hoisting mechanism after the unmanned aircraft takes off until a hoisting condition is satisfied, and to cause the linear member to be hoisted by the hoisting mechanism, after the unmanned aircraft has taken off, based on the hoisting condition being satisfied, wherein the hoisting condition corresponds to a state enabling hoisting of the linear member.

2. The unmanned aircraft system of claim 1, further comprising:
a detector configured to detect positional relationship information regarding a positional relationship between the unmanned aircraft and the package,
wherein the program code further includes:
positional relationship calculation code configured to cause at least one of the at least one processor to calculate the positional relationship between the unmanned aircraft and the package based on the positional relationship information, and
wherein the hoisting condition is satisfied where the positional relationship corresponds to the state enabling hoisting of the linear member.

3. The unmanned aircraft system of claim 2, wherein the state enabling hoisting of the linear member corresponds to a position of the unmanned aircraft being directly above the package.

4. The unmanned aircraft system of claim 2,
wherein the detector further includes an imaging unit configured to detect the positional relationship information by photographing an image including the package, and
wherein the positional relationship calculation code is further configured to cause at least one of the at least one processor to calculate the positional relationship between the unmanned aircraft and the package based on the image.

5. The unmanned aircraft system of claim 1, further comprising a retaining device adapted to fix and release the package relative to the ground surface,
wherein the flight control code is further configured to cause at least one of the at least one processor to cause the unmanned aircraft to take off in a state wherein the package is fixed by the retaining device.

6. The unmanned aircraft system of claim 5, wherein the flight control code is further configured to cause at least one of the at least one processor to cause the unmanned aircraft to take off in a state wherein the linear member is not released.

7. The unmanned aircraft system of claim 1, further comprising an altimeter configured to measure an altitude of the unmanned aircraft,
wherein the hoisting control code is further configured to cause at least one of the at least one processor to cause the linear member to be fed out by the hoisting mechanism based on the altitude.

8. An unmanned aircraft system comprising:
an unmanned aircraft including an altimeter configured to measure an altitude of the unmanned aircraft, and a hoisting mechanism configured to feed out and hoist a linear member, wherein the hoisting mechanism includes a measurement unit configured to measure a feed out length of the linear member;
at least one memory configured to store program code; and
at least one processor configured to access the program code and operate as instructed by the program code, the program code including:
flight control code configured to cause at least one of the at least one processor to cause the unmanned aircraft to take off in a state in which a package anchored to the linear member is on a ground surface; and
hoisting control code configured to cause at least one of the at least one processor to cause the linear member to be hoisted by the hoisting mechanism, after the unmanned aircraft has taken off, based on a hoisting condition being satisfied, wherein the hoisting condition corresponds to a state enabling hoisting of the linear member,
wherein the unmanned aircraft system further comprises a detector configured to detect positional relationship information regarding a positional relationship between the unmanned aircraft and the package based on the feed out length and the altitude,
wherein the program code further includes:
positional relationship calculation code configured to cause at least one of the at least one processor to calculate the positional relationship between the unmanned aircraft and the package based on the positional relationship information, and
wherein the hoisting condition is satisfied where the positional relationship corresponds to the state enabling hoisting of the linear member.

9. An unmanned aircraft system comprising:
an unmanned aircraft including a hoisting mechanism configured to feed out and hoist a linear member;
at least one memory configured to store program code; and
at least one processor configured to access the program code and operate as instructed by the program code, the program code including:
flight control code configured to cause at least one of the at least one processor to cause the unmanned aircraft to take off in a state in which a package anchored to the linear member is on a ground surface; and hoisting control code configured to cause at least one of the at least one processor to release the linear member to be drawable out from the hoisting mechanism after the unmanned aircraft takes off until a hoisting condition is satisfied, and to cause the linear member to be hoisted by the hoisting mechanism, after the unmanned aircraft has taken off based on the hoisting condition being satisfied, wherein the hoisting condition corresponds to a state enabling hoisting of the near member, wherein the unmanned aircraft system further comprises a detector configured to detect positional relationship information regarding a positional relationship between the unmanned aircraft and the package, wherein the program code further includes:
positional relationship calculation code configured to cause at least one of the at least one processor to calculate the positional relationship between the unmanned aircraft and the package based on the positional relationship information, wherein the hoisting condition is satisfied where the positional relationship corresponds to the state enabling hoisting of the linear member, and wherein the flight control code is further configured to cause at least one of the at least one processor to control flight of the unmanned aircraft based on the positional relationship after the unmanned aircraft takes off until the hoisting condition is satisfied.

10. A control device for an unmanned aircraft, the control device comprising:
at least one memory configured to store program code; and
at least one processor configured to access the program code and operate as instructed by the program code, the program code including:
flight control code configured to cause at least one of the at least one processor to cause the unmanned aircraft to take off in a state in which a package anchored to a linear member of the unmanned aircraft is arranged on a ground surface; and
hoisting control code configured to cause at least one of the at least one processor to cause the linear member to be fed out by a hoisting mechanism of the unmanned aircraft based on an altitude measured by an altimeter of the unmanned aircraft, and to cause the linear member to be hoisted by the hoisting mechanism after the unmanned aircraft has taken off based on a hoisting condition being satisfied, wherein the hoisting condition corresponds to a state enabling hoisting of the linear member.

11. The control device of claim 10, wherein the hoisting control code is further configured to cause at least one of the at least one processor to release the linear member to be drawable out from the hoisting mechanism after the unmanned aircraft takes off and until a hoisting condition is satisfied.

12. The control device of claim 10,
wherein the program code further includes:
positional relationship calculation code configured to cause at least one of the at least one processor to calculate a positional relationship between the unmanned aircraft and the package based on positional relationship information obtained via a detector of the unmanned aircraft, and wherein the hoisting condition is satisfied where the positional relationship corresponds to the state enabling hoisting of the linear member.

13. The control device of claim 12, wherein the state enabling hoisting of the linear member corresponds to a position of the unmanned aircraft being directly above the package.

14. A method of controlling an unmanned aircraft, the method comprising:
causing the unmanned aircraft to take off in a state in which a package anchored to a linear member is on a ground surface;
release the linear member to be drawable out from a hoisting mechanism after the unmanned aircraft takes off until a hoisting condition is satisfied; and
hoisting the linear member by the hoisting mechanism, after the unmanned aircraft has taken off, based on a hoisting condition being satisfied,
wherein the hoisting condition corresponds to a state enabling hoisting of the linear member.

15. The method of claim 14, further comprising:
calculating a positional relationship between the unmanned aircraft and the package based on positional relationship information obtained via a detector of the unmanned aircraft,
wherein the hoisting condition is satisfied where the positional relationship corresponds to the state enabling hoisting of the linear member.

16. The method of claim 15, wherein the state enabling hoisting of the linear member corresponds to a position of the unmanned aerial vehicle being directly above the package.

17. The method of claim 15, further comprising:
controlling flight of the unmanned aircraft based on the positional relationship after the unmanned aircraft takes off and until the hoisting condition is satisfied.

18. The method of claim 14, further comprising:
causing the linear member to be fed out by the hoisting mechanism based on an altitude of the unmanned aircraft.

* * * * *